H. CALKINS.
Wash-Boilers.

No. 151,838.

Patented June 9, 1874.

Witnesses.
E. Wolff.
Jacob Felbel

Inventor.
Hiram Calkins
By attorney

UNITED STATES PATENT OFFICE.

HIRAM CALKINS, OF NEW YORK, N. Y.

IMPROVEMENT IN WASH-BOILERS.

Specification forming part of Letters Patent No. 151,838, dated June 9, 1874; application filed April 25, 1874.

*To all whom it may concern:*

Be it known that I, HIRAM CALKINS, of New York city, in the county of New York, in the State of New York, have invented an Apparatus for Washing and Bleaching Clothes; and I do hereby declare that the following is a full and exact description thereof, reference being had to the accompanying drawings, and to the letters of reference marked thereon.

My invention relates to certain new and useful improvements in that kind of washing-machines in which the clothes to be washed are subjected to the action of steam in a partially-closed vessel. My invention consists in a machine composed of a suitable vessel for holding the water from which to generate the steam, and a clothes-chamber adapted to fit into said vessel, the whole so constructed and operating that when they are put together there shall be a steam-space between the vertical walls of the clothes-chamber and those of the water-containing vessel, for the passage of the steam upwardly around the clothes-chamber, and an inclosed space beneath the whole bottom of the clothes-chamber, but obstructing only a small part of the water-level, whereby the ready return to the bottom of the boiler of the water of condensation may occur, the whole arranged and operating as will be hereinafter more fully explained; and my invention further consists in the combination, with the boiler and clothes-chamber, of a double cover or top portion, adapted to be fastened down on the boiler, and so constructed that the steam shall enter it only through numerous perforations in its lower wall, completely and constantly fill it, and escape through a suitable escape nozzle or aperture near the center of its upper wall or portion, as and for purposes to be hereinafter more fully described.

To enable those skilled in the art to make and use my invention, I will proceed to more fully describe the construction and operation of my improved steam washing-machine, referring by letters to the accompanying drawings, in which I have represented one of said machines.

Figure 1:
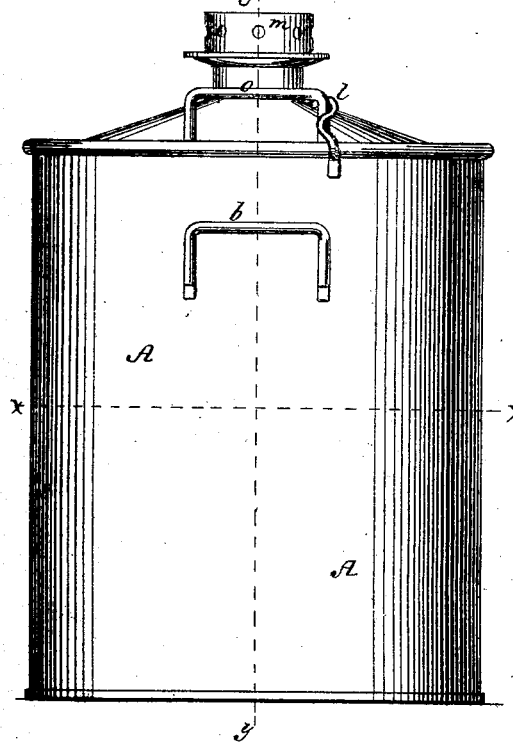
Figure 2:
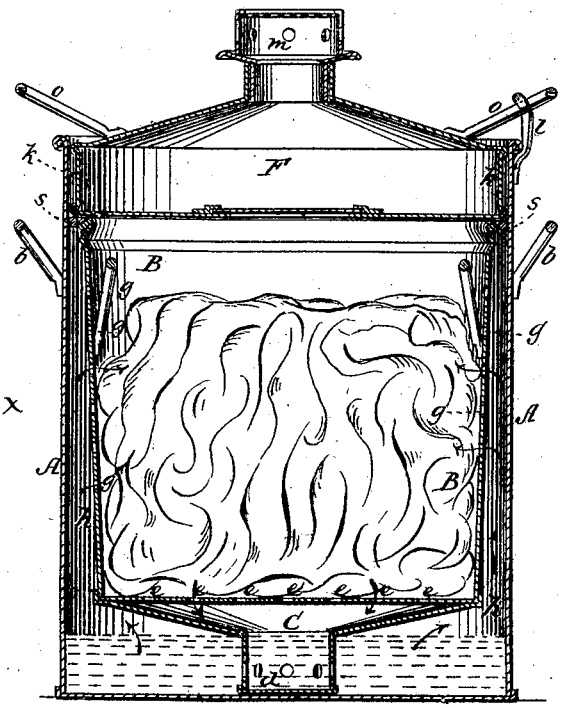
Figure 3:
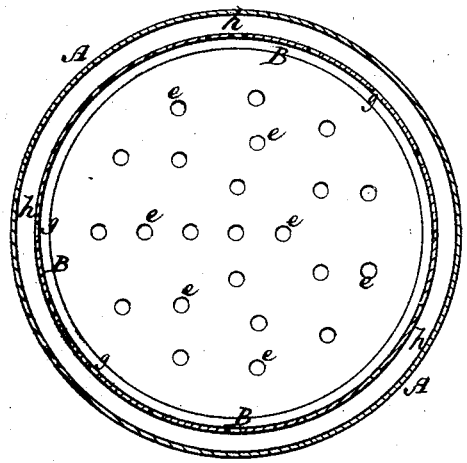
Figure 4:
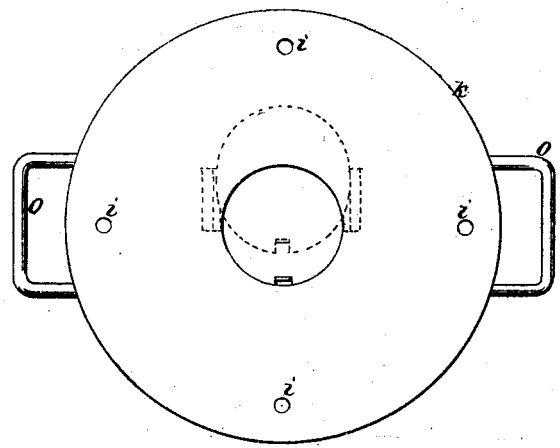

In the said drawings, Figure 1 is a side elevation; Fig. 2, a vertical central section; Fig. 3, a horizontal section, at the line $x\,x$ of Fig. 1; and Fig. 4, a bottom view of the double cover or top detached from the rest of the machine.

In these several figures I have designated the same part by the same letter of reference.

A is the boiler proper, or the vessel into which the water is put, and in which the generation of the steam is effected. This vessel A is illustrated as being about cylindrical in form or contour, and in a full-sized working machine, I have made it about twenty inches in height and about eighteen inches in diameter; but the size and shape may, of course, be varied at the pleasure of the manufacturer. It is provided with suitable handles $b\,b$, by which it may be conveniently lifted and managed. Within this vessel A is arranged or placed a chamber, B, which, as clearly seen at Figs. 2 and 3, corresponds in its shape in cross-section to the form of the vessel A, is made tapering in vertical section, being smaller near the lower portion than at the top, and is formed with a chamber, C, at its lower end, with a centrally-projecting downward extension, $d$, which passes down into the water contained in the vessel A, as shown. This chamber, it will be seen, is supported by the rim $f$, so as to have its chamber $c$ located above the level of the water in boiler A. The water-level is represented by the dotted line in Fig. 2. $e\,e$ are perforations in the bottom of the chamber or space C, through which the condensed steam enters into the water-space. $g\,g$ are perforations in the side walls or body of the clothes-chamber, through which the steam enters from the steam-space which surrounds said chamber, or is formed between the exterior of said chamber and the interior of the vessel A, as indicated by the letter $h$. As the side walls of vessel A are vertical, and those of the chamber B are oblique or flared outward, the steam-space $h$ diminishes in area as it ascends, so that the greatest volume of steam will surround the lower portion of chamber B. The direction of the currents of steam and water of condensation is illustrated in the drawings by the arrows. The cover or top of the machine is composed of a hollow lid or chamber, so made as to embody a steam-chamber, F, into which the steam enters at the holes $i\,i$ in its bottom wall, and from which the said steam escapes at the central escape-pipe *m* in its upper wall. The vertical side walls *k* of this double cover fit closely into the upper portion of the boiler A, as shown, and the said cover is held securely in place by means of hooks or lips *l l* on the upper edge of boiler A, beneath which the handles *o o* of the said double cover interlock. The exit steam pipe or nozzle *m* is, by preference, made with fine perforations, so as to retard the escape of the steam, and induce to a sufficient accumulation and pressure of steam within the boiler, and by having the chamber B made tapering, so as to about fit or fill the boiler A near the top, as shown, the volume of steam in the space *h* will be somewhat compressed, and more effectually forced radially into the clothes-chamber, through all the numerous holes in the vertical or side walls of the latter.

In the use of my improved machine, I put into the boiler A a sufficient quantity of water to fill it up to about the level indicated by the dotted line at Fig. 2, and after having simply wetted and wrung out the clothes, I pile or place them all (loosely) in the chamber B. I then put the chamber B into its proper place within the vessel or boiler A, having first put some soap-shavings into the water, and, where there are very dirty places in the clothes, rub a little soap on such places, fasten on the double cover, and place the boiler on the range or stove. From ten to twenty minutes, according to the kind of clothes, after the steam is fairly up, will prove a sufficient time to subject the clothes to the action of the steam, and upon their removal and rinsing them out in warm water and drying, they will be found to have been thoroughly washed and bleached perfectly white.

I have found in the practical operation of my machine that generally about ten minutes is sufficient to produce the desired effect on sheets and other such articles, and about twenty minutes for the same effect on shirts, stockings, and articles which generally require more washing.

It will be understood that by having the cover of the machine made with two heads connected with a hoop portion, so as to form a chamber, as described, the condensation which would otherwise occur at the upper part of the clothes-chamber is avoided, and a plentiful supply of live steam kept constantly in contact with the upper portion of the mass of clothes, and it will be seen that by having the chamber B formed with a space at C, for the reception of the products of condensation, and made with its side walls converging as they ascend toward the walls of the boiler-vessel A, the steam will be compelled to enter and force its way through all the perforations in the vertical side walls of B, and penetrate toward the center of the mass of clothes, as well as come in constant contact with the upper part of the contained clothes.

Having so far explained the nature of my invention and the construction and operation thereof as to enable a skilled person to make and use my improved apparatus, what I claim therein as new, and desire to secure by Letters Patent, is—

1. In combination with a suitable vessel, A, for the generation of the steam, a clothes-chamber, B, constructed substantially as described, with a chamber, C, about equal in area at its upper part to the area of the perforated bottom of the said chamber B, and contracted at its lower portion, the whole so arranged and operating that the clothes contained in the chamber B will be quite or nearly surrounded by the annular steam-space, from which the steam enters said chamber radially through numerous perforations, and that the waters of condensation will freely descend through the numerous perforations in the bottom of said chamber, and be conducted to the center of the vessel A, at or near the water-level.

2. The chambered top portion or cover, composed of two heads, and adapted to fit in the top of the vessel A, and be therein secured, when provided with openings only in its lower head for the ingress of steam from the chamber B only, and with escape-openings at its top for the egress of the steam, and avoidance of too great pressure in the boiler.

In testimony whereof I have hereunto set my hand and seal this 18th day of April, 1874.

HIRAM CALKINS. [L. S.]

In presence of—
J. N. McINTIRE,
JACOB FELBEL.